United States Patent
McKay et al.

(10) Patent No.: US 7,663,548 B2
(45) Date of Patent: Feb. 16, 2010

(54) SWITCHED COMBINER GPS RECEIVER SYSTEM

(75) Inventors: James P. McKay, Hermosa Beach, CA (US); Gan-Tai Tseng, Rancho Palos Verdes, CA (US)

(73) Assignee: The Aerospace Corporation, El Segundo, CA (US)

(*) Notice: Subject to any disclaimer, the term of this patent is extended or adjusted under 35 U.S.C. 154(b) by 0 days.

(21) Appl. No.: 11/277,470

(22) Filed: Mar. 24, 2006

(65) Prior Publication Data

US 2007/0222680 A1    Sep. 27, 2007

(51) Int. Cl.
*G01S 5/02* (2006.01)
(52) U.S. Cl. .................................................. 342/424
(58) Field of Classification Search ............... 342/424, 342/357.1–17
See application file for complete search history.

(56) References Cited

U.S. PATENT DOCUMENTS

| | | | |
|---|---|---|---|
| 3,594,811 A * | 7/1971 | Pierrot | 342/350 |
| 3,824,500 A | 7/1974 | Rothenberg | |
| 4,107,682 A | 8/1978 | Boucher et al. | |
| 5,017,927 A * | 5/1991 | Agrawal et al. | 342/371 |
| 5,107,273 A * | 4/1992 | Roberts | 342/417 |
| 5,194,873 A * | 3/1993 | Sickles, II | 342/374 |
| 5,335,010 A * | 8/1994 | Lindemeier et al. | 348/706 |
| 5,350,137 A * | 9/1994 | Henley | 244/158.1 |
| 5,883,552 A * | 3/1999 | McKay | 333/125 |
| 5,926,128 A | 7/1999 | Brash et al. | |
| 6,005,516 A * | 12/1999 | Reudink et al. | 342/375 |
| 6,323,817 B1 * | 11/2001 | Ramanujam et al. | 343/781 P |
| 6,356,242 B1 * | 3/2002 | Ploussios | 343/795 |
| 6,714,768 B2 * | 3/2004 | Lempkowski | 455/101 |
| 6,812,824 B1 * | 11/2004 | Goldinger et al. | 340/10.1 |
| 6,906,664 B2 * | 6/2005 | Tseng et al. | 342/357.11 |
| 6,967,992 B1 * | 11/2005 | Rabaeijs et al. | 375/150 |
| 7,030,813 B1 * | 4/2006 | Lopez | 342/427 |
| 7,071,873 B2 * | 7/2006 | Tomasic et al. | 342/372 |
| 2002/0057218 A1 | 5/2002 | Smith | |
| 2003/0043086 A1 | 3/2003 | Schaffner et al. | |
| 2003/0214443 A1 | 11/2003 | Bauregger et al. | |
| 2004/0027198 A1 * | 2/2004 | Chandrasekaran et al. | 330/149 |
| 2004/0263421 A1 | 12/2004 | Schaffner et al. | |
| 2005/0136856 A1 | 6/2005 | Goldberg | |

* cited by examiner

*Primary Examiner*—Thomas H Tarcza
*Assistant Examiner*—Harry Liu
(74) *Attorney, Agent, or Firm*—Henricks, Slavin & Holmes LLP

(57) ABSTRACT

A receiving system includes a combiner configured to receive signals from two or more antenna elements and to generate sum and difference outputs, and a switch configured to sequentially provide the sum and difference outputs as inputs to a receiver.

18 Claims, 3 Drawing Sheets

SWITCHED COMBINER GPS RECEIVER SYSTEM

STATEMENT OF GOVERNMENT INTEREST

The invention was made with Government support under contract No. FA8802-04-C-0001 by the Department of the Air Force. The Government has certain rights in the invention.

TECHNICAL FIELD

The invention relates generally to receiver systems and, in particular, to receiver systems with multiple antennas.

BACKGROUND ART

For certain applications, such as launch vehicle tracking, a full view of the complete sky is not always available using a single antenna. For example, a Global Positioning System (GPS) receiver may not be able to receive signals from an adequate number of satellites to perform an accurate position computation. When this is the case, multiple antennas may be required.

FIG. 1 shows a receiving system 100 that utilizes two antennas 102 and 104, mounted on a launch vehicle 106, configured with a combiner 108 and a single GPS receiver 110 as shown. FIG. 2 shows a receiving system 200 that utilizes multiple antennas 202 and 204, mounted on a launch vehicle 206, configured with an equal number of GPS receivers (or correlators) 208 and 210, respectively. FIG. 5 shows an example of typical antenna pattern coverage 500 provided by the receiver system 100. FIG. 6 shows an example of typical antenna pattern coverage 600 provided by the receiver system 200.

As between the two systems, the receiving system 100 (FIG. 1) is the least expensive approach, but leads to signal drop-outs due to the antenna interference patterns (FIG. 5). The receiving system 200 (FIG. 2) can provide better antenna pattern coverage (FIG. 6) than the receiving system 100, but is likely to be more expensive because multiple GPS receivers or correlators are required.

It would be useful to be able to provide a receiving system solution that is simpler and less expensive than using multiple correlators or receivers, and minimizes the interference problem associated with combining the signals from multiple antennas into a single receiver.

DISCLOSURE OF INVENTION

Embodiments of receiver systems and methods described herein utilize switched, combined antenna elements to receive signals (e.g., GPS satellite signals when a clear view of the complete sky is not available using a single antenna element). In an example application, two or more antenna elements are mounted on the surface of an object such as a launch vehicle or other projectile. However, it should be appreciated that the principles described herein are also applicable to two or more antenna elements that may be mounted on more than a single object. Furthermore, the antenna elements can be mounted to objects other than launch vehicles or projectiles.

The use of switched, combined antenna elements in embodiments described herein provides a receiver solution that is simpler and less expensive than prior receiver systems using multiple correlators or receivers, and minimizes or decreases the interference problem associated with combining signals from multiple antennas into a single receiver.

Figure 3:
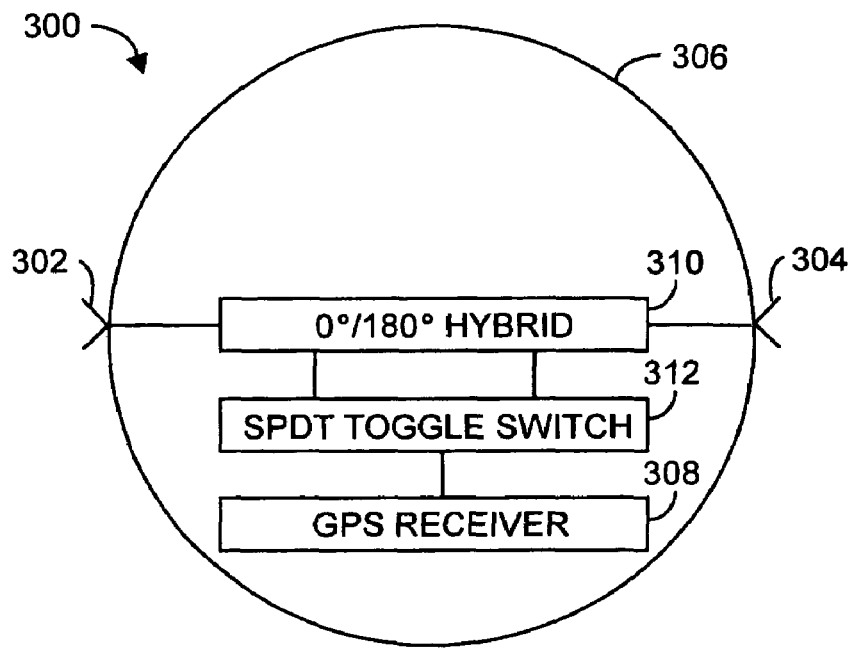
FIG. 3 illustrates an example embodiment of a receiver system that includes two antennas mounted on a launch vehicle and connected to a GPS receiver using a sum-and-difference hybrid combiner and a single-pole, double-throw toggle switch.
Figure 7:
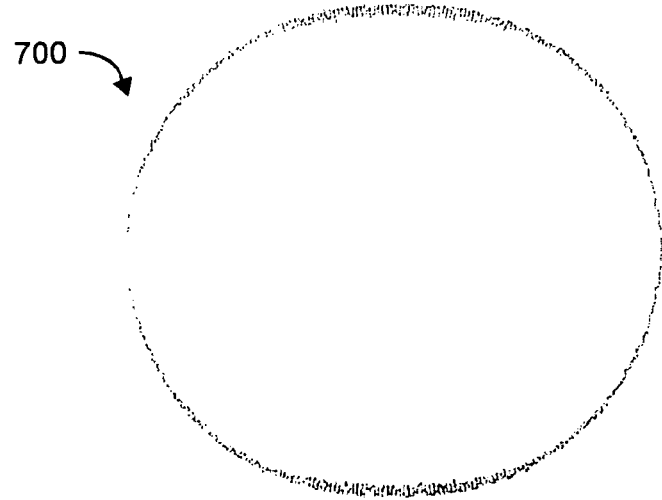
FIG. 7 shows an example of typical antenna pattern coverage provided by the receiver system of FIG. 3.

FIG. 3 illustrates an example embodiment of a receiver system 300 that includes two antennas 302 and 304 mounted on a launch vehicle 306 and connected to a GPS receiver 308 using a sum-and-difference hybrid combiner 310 and a single-pole, double-throw (SPDT) toggle switch 312 configured as shown. In an example embodiment, the signals from the two antenna elements 302 and 304 are fed into the combiner 310 (e.g., a four-port microwave hybrid combiner) that has two outputs. These two outputs, a sum output and a difference output, are fed into the SPDT switch 312. In an example embodiment, the SPDT switch 312 is set to toggle in a continuous fashion so that the sum and difference outputs of the hybrid are alternately selected in a periodic manner. The functionality of the SPDT switch 312 can be implemented in software as well as hardware. FIG. 7 shows an example of typical antenna pattern coverage 700 provided by the receiver system 300.

Figure 1:
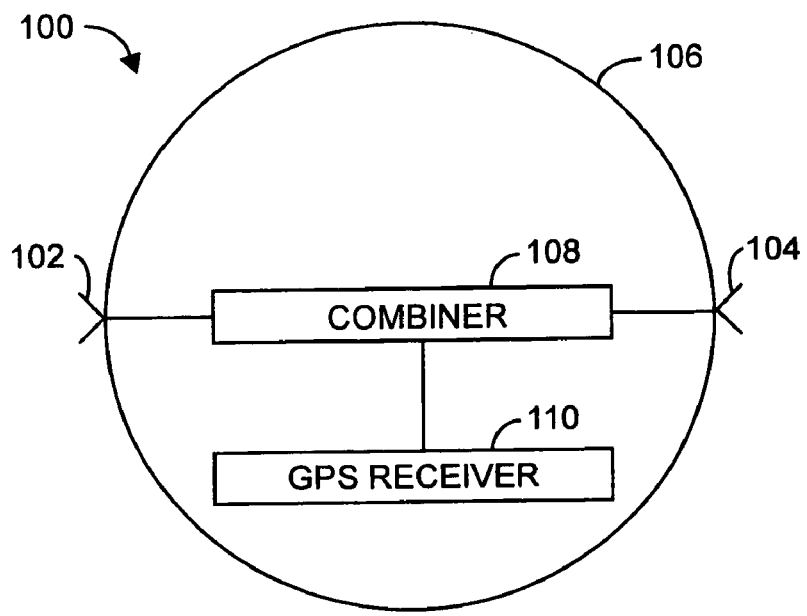
FIG. 1 illustrates a conventional receiver system that includes two antennas mounted on a launch vehicle and connected to a GPS receiver using a combiner.
Figure 2:
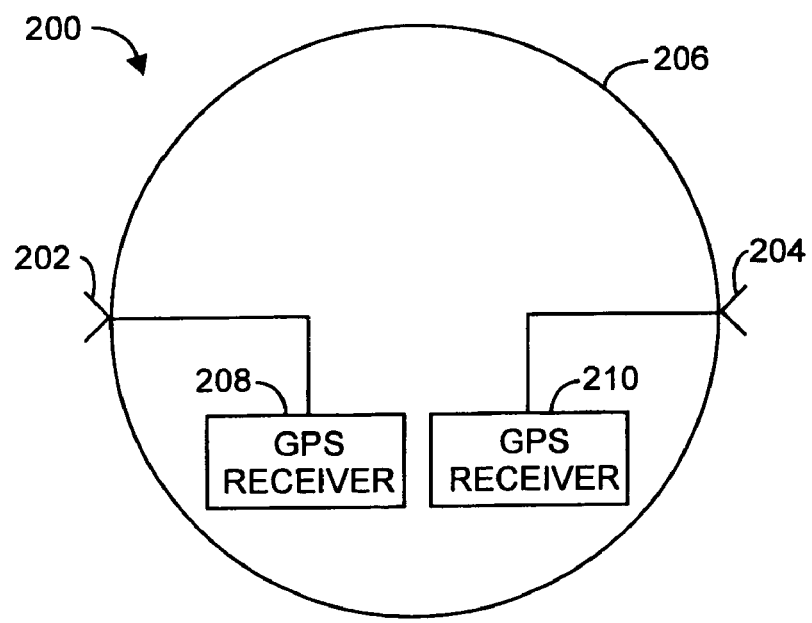
FIG. 2 illustrates a conventional receiver system that includes two antennas mounted on a launch vehicle and individually connected to two GPS receivers.

Relative to the conventional receiver system 100 (FIG. 1), the receiver system 300 is only slightly more expensive, and eliminates or substantially eliminates performance degradation associated with the interference patterns of multiple antenna elements. Additionally, the receiver system 300 is likely to be less expensive than the conventional receiver system 200 (FIG. 2) because only one receiver is required. Furthermore, relative to the conventional receiver system 200 (FIG. 2), the receiver system 300 provides 3 dB higher gain at angles midway between the boresights of each pair of antenna elements.

In an example embodiment, a receiving method includes combining outputs of two or more antenna elements to generate sum and difference signals, and sequentially switching between the sum and difference signals to provide inputs to a receiver. In an example embodiment, the switching occurs at a substantially constant rate. In an example embodiment, the switching is substantially periodic.

In another example embodiment, a receiving method includes providing a launch vehicle with two or more antenna elements, combining outputs of the two or more antenna elements to generate sum and difference signals, and switching between the sum and difference signals to provide inputs to a global positioning system (GPS) receiver.

Embodiments described herein involve the use of a combiner and toggle switch between multiple antenna elements and a single receiver. Embodiments described herein utilize a switch and combiner in between a GPS receiver and multiple antenna elements to eliminate signal drop-outs and increase signal gain at minimum cost and are implemented with minimum complexity.

Figure 4:
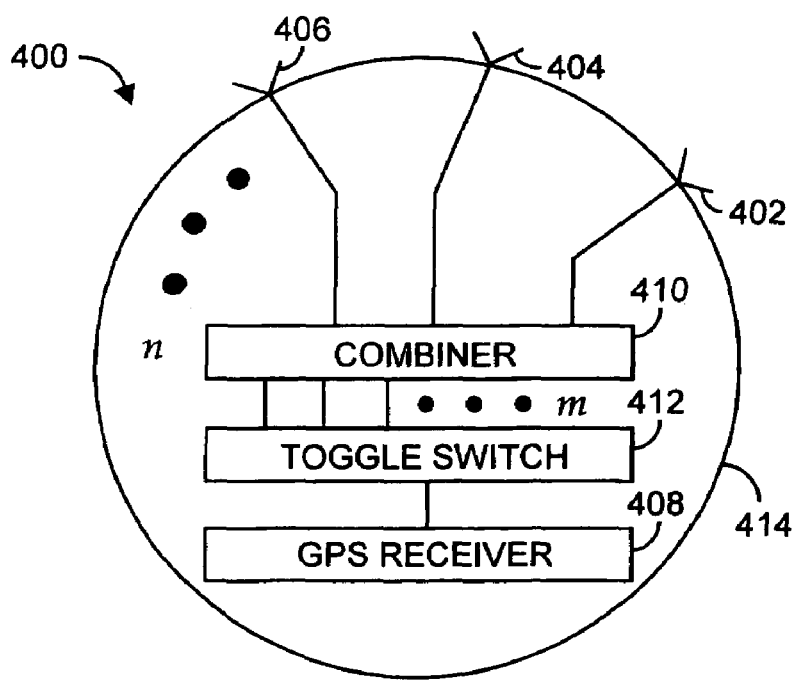
FIG. 4 illustrates an example embodiment of a receiver system that includes n antennas mounted on a launch vehicle and connected to a GPS receiver using an n-input, m-output combiner and a toggle switch.
Figure 5:
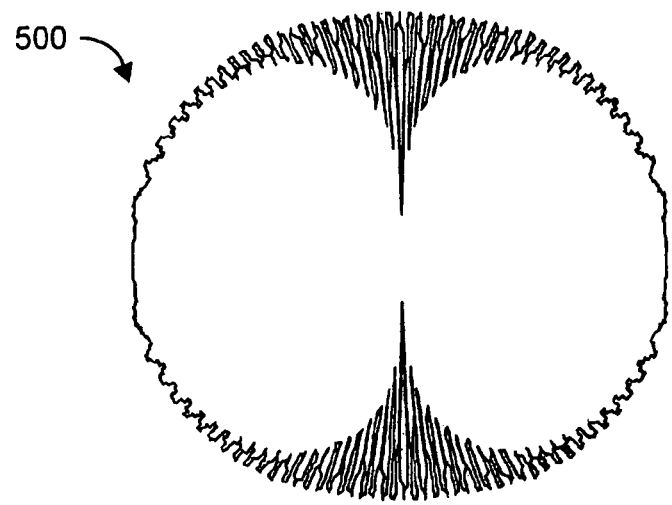
FIG. 5 shows an example of typical antenna pattern coverage provided by the conventional receiver system of FIG. 1.
Figure 6:
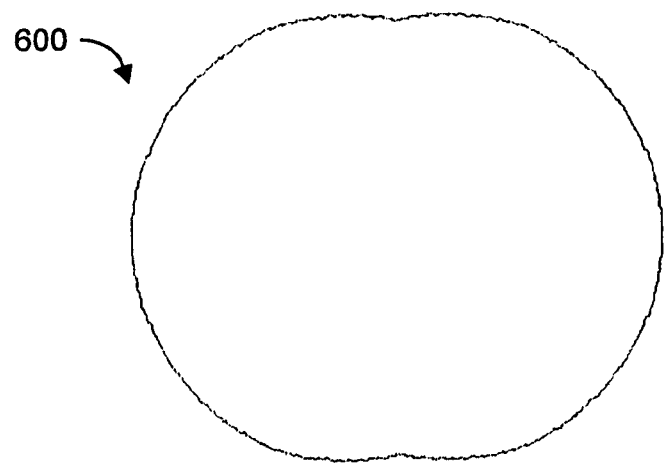
FIG. 6 shows an example of typical antenna pattern coverage provided by the conventional receiver system of FIG. 2.

FIG. 4 illustrates an example embodiment of a receiver system 400 that includes n antennas connected to a GPS receiver 408 using an n-input, m-output combiner 410 and a toggle switch 412, where n and m are arbitrary integers. In this example embodiment, the combiner 410 functions as follows: The n inputs are combined in m ways in order to optimize system performance, for example, by providing maximum gain coverage in certain directions or around a launch vehicle or mounting structure or structures. In this example embodiment, the n antennas are illustrated as antennas 402, 404 and 406; however, it should be understood that n≧2 and therefore a greater number of antennas than three can be mounted, or otherwise employed, on the launch vehicle 414. In this example embodiment, the launch vehicle 414 is illustrated as being cylindrical in shape; however, it should be understood that the principles described herein are applicable to antenna elements operatively engaged with launch vehicles, projectiles and other objects regardless of shape and for any configuration or arrangement of the antenna elements.

Embodiments described herein exploit the increased gain that occurs when signals from two or more antennas are combined. This typically provides at least 3 dB more gain than the conventional systems, which do not utilize signal combining. Embodiments described herein exploit the relationship between the sum and difference patterns of two antennas. The local maxima of the sum pattern of two antennas occur at exactly the same angles as the local minima of the difference pattern, and the local maxima of the difference pattern occur at exactly the same angles as the local minima of the sum pattern. The toggle switch provides the receiver with both the sum and difference patterns, so that the receiver periodically has access to a strong signal and therefore drop-outs due to the antenna interference effect are eliminated or substantially eliminated. Due to the unique nature of GPS signal processing, there is no system performance degradation and no information is lost during switching periods when the output of the toggle switch is connected to neither the sum nor the difference outputs of the hybrid, as long as these time periods are sufficiently small, an objective easily achievable with modern electronic switches. Embodiments described herein facilitate obtaining a full view of the sky using multiple GPS antennas at a lower cost and with improved performance.

In an example embodiment, a receiving system includes a combiner configured to receive signals from two or more antenna elements and to generate sum and difference outputs, and a switch configured to sequentially provide the sum and difference outputs as inputs to a receiver. In an example embodiment, the combiner is a microwave hybrid combiner. In an example embodiment, the two or more antenna elements are positioned on a launch vehicle. In an example embodiment, the switch is configured to sequence through the sum and difference outputs at a substantially constant rate. In an example embodiment, the switch is configured to sequence through the sum and difference outputs in a substantially periodic manner. In an example embodiment, the switch is a toggle switch. In an example embodiment, the switch is a single-pole, double-throw (SPDT) switch. In an example embodiment, the receiver is a global positioning system (GPS) receiver.

In an example embodiment, a receiving system includes a sum and difference combiner configured to receive signals from two or more antenna elements and to generate combiner outputs, a receiver, and means for selectively providing the combiner outputs as inputs to the receiver. In an example embodiment, the sum and difference combiner is a microwave hybrid combiner. In an example embodiment, the two or more antenna elements are positioned on a launch vehicle. In an example embodiment, the receiver is a global positioning system (GPS) receiver. In an example embodiment, the means for selectively providing the combiner outputs is configured to sequence through the combiner outputs at a substantially constant rate. In an example embodiment, the means for selectively providing the combiner outputs is configured to sequence through the combiner outputs in a substantially periodic manner. In an example embodiment, the means for selectively providing the combiner outputs includes a toggle switch. In an example embodiment, the means for selectively providing the combiner outputs includes a single-pole, double-throw (SPDT) switch.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A receiving system comprising:
   a combiner configured to receive signals from two or more antenna elements, at least two of the antenna elements being positioned at diametrically opposite sides of a launch vehicle, and to generate sum and difference outputs in amplitude and phase; and
   a switch configured to sequentially provide the sum and difference outputs as inputs to a receiver such that the antenna elements provide substantially uniform spherical pattern coverage.

2. The receiving system of claim 1, wherein the combiner is a microwave hybrid combiner.

3. The receiving system of claim 1, wherein the switch is configured to sequence through the sum and difference outputs at a substantially constant rate.

4. The receiving system of claim 1, wherein the switch is configured to sequence through the sum and difference outputs in a substantially periodic manner.

5. The receiving system of claim 1, wherein the switch is a toggle switch.

6. The receiving system of claim 1, wherein the switch is a single-pole, double-throw (SPDT) switch.

7. The receiving system of claim 1, wherein the receiver is a global positioning system (GPS) receiver.

8. A receiving system comprising:
   a sum and difference combiner configured to receive signals from two or more antenna elements, at least two of the antenna elements being positioned at diametrically opposite sides of a launch vehicle, and to generate combiner outputs in amplitude and phase;
   a receiver; and
   means for selectively providing the combiner outputs as inputs to the receiver such that the antenna elements provide substantially uniform spherical pattern coverage.

9. The receiving system of claim 8, wherein the sum and difference combiner is a microwave hybrid combiner.

10. The receiving system of claim 8, wherein the receiver is a global positioning system (GPS) receiver.

11. The receiving system of claim 8, wherein the means for selectively providing the combiner outputs is configured to sequence through the combiner outputs at a substantially constant rate.

12. The receiving system of claim 8, wherein the means for selectively providing the combiner outputs is configured to sequence through the combiner outputs in a substantially periodic manner.

13. The receiving system of claim 8, wherein the means for selectively providing the combiner outputs includes a toggle switch.

14. The receiving system of claim 8, wherein the means for selectively providing the combiner outputs includes a single-pole, double-throw (SPDT) switch.

15. A receiving method comprising:
- combining outputs of two or more antenna elements, at least two of the antenna elements being positioned at diametrically opposite sides of a launch vehicle, to generate sum and difference signals in amplitude and phase; and
- sequentially switching between the sum and difference signals to provide inputs to a receiver such that the antenna elements provide substantially uniform spherical pattern coverage.

16. The receiving method of claim 15, wherein the switching occurs at a substantially constant rate.

17. The receiving method of claim 15, wherein the switching is substantially periodic.

18. A receiving method comprising:
- providing a launch vehicle with two or more antenna elements, at least two of the antenna elements being positioned at diametrically opposite sides of a launch vehicle;
- combining outputs of the two or more antenna elements to generate sum and difference signals in amplitude and phase; and
- switching between the sum and difference signals to provide inputs to a global positioning system (GPS) receiver such that the antenna elements provide substantially uniform spherical pattern coverage.

* * * * *